United States Patent [19]

Wyganowski

[11] Patent Number: 5,036,915

[45] Date of Patent: Aug. 6, 1991

[54] METHOD OF REDUCING THE REACTIVITY OF STEAM AND CONDENSATE MIXTURES IN ENHANCED OIL RECOVERY

[75] Inventor: Michael W. Wyganowski, Calgary, Canada

[73] Assignees: Alberta Energy Company Ltd.; Amoco Canada Petroleum Company Ltd.; Diminex (Canada) Limited, all of Calgary, Canada; a part interest

[21] Appl. No.: 441,454

[22] Filed: Nov. 27, 1989

Related U.S. Application Data

[63] Continuation-in-part of Ser. No. 290,232, Dec. 27, 1988, abandoned.

[30] Foreign Application Priority Data

Nov. 10, 1988 [CA] Canada .................................. 582890

[51] Int. Cl.$^5$ .................... E21B 37/06; E21B 43/24
[52] U.S. Cl. .................... 166/252; 166/279; 166/303; 166/305.1; 252/8.552
[58] Field of Search ............. 166/252, 272, 275, 279, 166/303, 305.1, 902; 252/8.552, 8.554

[56] References Cited

U.S. PATENT DOCUMENTS

| | | | |
|---|---|---|---|
| 3,353,593 | 11/1967 | Boberg | 166/272 X |
| 3,379,249 | 4/1968 | Gilchrist et al. | 166/303 X |
| 3,384,177 | 5/1968 | Day et al. | 166/307 |
| 4,088,188 | 5/1978 | Widmyer | 166/303 X |
| 4,308,152 | 12/1981 | Newman et al. | 166/252 X |
| 4,475,595 | 10/1984 | Watkins et al. | 166/303 |
| 4,549,609 | 10/1985 | Watkins et al. | 166/303 |
| 4,572,296 | 2/1986 | Watkins | 166/303 |
| 4,714,112 | 12/1987 | Nigrini et al. | 166/252 |
| 4,802,533 | 2/1989 | Hsueh et al. | 166/252 |
| 4,903,769 | 2/1990 | Hsueh et al. | 166/252 X |

OTHER PUBLICATIONS

"Process Aids Enhanced Oil Recovery", *C & EN*, Jun. 7, 1982, p. 38.

Rohrback, Dr. Gilson, "New Additive Promises Revised Steam-Stimulation Economics", *The Oil and Gas Journal*, Oct. 10, 1966, pp. 207–209.

*Primary Examiner*—George A. Suchfield
*Attorney, Agent, or Firm*—William R. Hinds

[57] ABSTRACT

This invention relates generally to a method for reducing the reactivity of steam or mixtures of steam and condensate in enhanced oil recovery. More particularly, the method of the invention comprises pH control through the injection or addition of either or both of ammonia and an ammonium salt of an organic or inorganic acid, such as ammonium chloride, to the feed water used to generate the steam or to the steam itself. This inhibits the dissolution of certain mineral groups, controls the migration of fines, inhibits the swelling of clays, controls chemical reactions in which new clay minerals are formed, and helps to prevent the precipitation of asphaltenes and the formation of emulsions as a result of steam injection.

29 Claims, No Drawings

METHOD OF REDUCING THE REACTIVITY OF STEAM AND CONDENSATE MIXTURES IN ENHANCED OIL RECOVERY

CROSS REFERENCE TO RELATED APPLICATION

This application is a continuation-in-part of my earlier application Ser. No. 290,232, filed Dec. 27, 1988, now abandoned.

BACKGROUND OF THE INVENTION

In the recovery of bitumen or heavy oil from a geological formation or oil reservoir, it is common practice to inject steam or a mixture of steam and hot water. This heats the oil or bitumen and renders it less viscous and less dense, both of which aid in its expulsion from the rock.

In order to generate the steam, a naturally occurring or recycled source water is first treated to convert calcium and magnesium carbonates to sodium bicarbonate. The water is then converted to a mixture of steam and water which typically consists of between 50 and 80 percent by weight of saturated steam and the remainder water at its bubble point, the latter commonly known as the "condensate" phase. Such mixtures are referred to as having steam qualities of between 50 and 80 percent. The mixture of steam and condensate is then either injected into the reservoir or separated into two phases, and only the steam phase injected.

In the steam generator, the bicarbonate ions present in the feedwater thermally decompose as follows:

$$HCO_3^- \xrightarrow{heat} OH^- + CO_2 \qquad (1)$$

Much of the carbon dioxide is evolved as a gas and partitions into the vapor phase, while the hydroxyl ion remains in the condensate phase, increasing its pH, often to a value between 9 and 12 when measured at 25° C.

When both the steam and condensate phases are injected into the wellbore, they tend to segregate soon after injection, with the upper part of the formation being contacted by substantially only steam and the lower part by substantially only condensate.

As the steam phase cools in the reservoir, the steam condenses and some of the carbon dioxide present dissolves in the liquid. Thus, the pH of the "condensed steam" phase is lowered as carbonic acid is formed, typically to a value of between 4 and 7 when measured at 25° C.

$$CO_2 + H_2O \rightarrow H^+ + HCO_3^- \qquad (2a)$$

$$HCO_3^- \rightarrow H^+ + CO_3^= \qquad (2b)$$

When the injected fluids contact the formation, the equilibrium between the minerals and the pore fluids is almost invariably destroyed. New minerals may precipitate due to incompatibility between the injected and original waters, some of the original rock matrix may dissolve and be subject to reprecipitation when conditions later are changed in the process of oil recovery, the dissolved minerals may release fine particles which had previously been bound to the rock matrix, the existing minerals may be converted to new minerals through reaction with the injected fluids and with each other, layered clays such as montmorillonite may expand, and fine particles which had previously been weakly held together and to the walls of the rock matrix may deflocculate, or disperse. In some cases, water-in-oil emulsions may be formed or asphaltenes may be precipitated. All of these changes can be harmful to the process of oil recovery.

The obvious method of neutralizing the alkaline condensate phase with a strong acid has the disadvantage that much of the acid will vaporize, causing corrosion and increasing the other problems associated with an acidic steam phase. Consequently, alternative methods have been developed in the prior art to mitigate formation damage caused by alkaline steam condensate. There are few techniques available to deal with formation damage caused by an acidic condensed steam phase.

It is well known in the prior art that the addition of dissolved salts to the injected steam will mitigate clay swelling by maintaining a high ionic content in the condensate phase. However, this method requires a relatively high level of salt, 2 to 4 percent by weight being a typical concentration, which is both costly and can accelerate corrosion.

Hsueh and Reed apply this concept in U.S. Pat. No. 4,802,533 to the condensed steam phase. Ammonium salts are added to the wet steam mixture, whereupon they decompose, and much of the ammonia partitions into the vapor phase. As the steam condenses in the reservoir, the ammonia is absorbed into the condensed steam, thereby increasing its ionic content. This technology is expensive, requiring both a large quantity of ammonium ion and a second chemical additive, a bicarbonate ion source, to prevent the pH of the condensate phase from becoming too low. The pH of the condensed steam phase, containing dissolved ammonia and carbon dioxide (from the bicarbonate), is not controlled.

Day et al, in U.S. Pat. No. 3,384,177, prevent the formation of montmorillonite by a pretreatment which promotes formation of mica and analcite phases. These authors also use ammonia as an additive, but at high concentration and at pH above 11. This technique is not only costly but may also be associated with other harmful reactions taking place between the mineral and fluid phases at high pH, such as silica dissolution.

U.S. Pat. No. 4,475,595 to Watkins et al discloses that ammonium compounds are effective in controlling the dissolution of silica in a reservoir, including "gravel packs" sometimes used to line a wellbore. The only type of formation damage claimed to be controlled in this patent is the dissolution and reprecipitation of silica, no other minerals are claimed to be affected by the practice of this invention.

Nigrini et al extend the prior art in U.S. Pat. No. 4,714,112, disclosing a process for minimizing the dissolution of either silicate of carbonate formations. In this process, ammonium salts are used to maintain the pH of the condensate phase between 8 and 10. Although it is recognized that both the alkaline condensate phase and the acidic condensed steam phase are capable of damage, only the alkaline condensed steam phase pH is directly controlled, and only to within the optimum range for minimizing silica dissolution.

Thus, it would be an improvement over these teachings if a method were available for controlling both the pH of the condensate and condensed steam phases within the ranges optimized for preventing types of formation damage other than those resulting from silica dissolution.

In Watkins et al, U.S. Pat. No. 4,549,609, a method is disclosed for stabilizing swelling clays and reducing fines migration. This U.S. Patent teaches that the addition of an ammonium compound in combination with a precursor comprised of ammonia or a water soluble ammonium ion controls the migration of fines and the swelling of clays in a reservoir.

In U.S. Pat. No. 4,572,296 Watkins et al disclosed that an ammonium compound in combination with a precursor as described above is more effective in controlling silica and gravel pack dissolution than the application of an ammonium compound by itself.

The practice of both the preceding patents focuses on the addition of ammonium compounds, rather than any control of pH. This is evidenced by the need for two separate additives when pH could be controlled by one, and by the choice of preferred additives, which can have the effect of increasing, decreasing, or leaving essentially unchanged the pH of the liquid phase, depending on the additive employed.

Thus, prior art processes employing ammonium compounds to reduce formation damage fall into two general categories: those using pH control to minimize dissolution of rock matrix, and those using control of the ammonium ion concentration to inhibit clay swelling or reduce fines migration. I have found that the techniques of pH control can be applied to the inhibition of clay swelling and the reduction of fines migration, and can also be used to mitigate formation damage caused by formation of water-in-oil emulsions, precipitation of asphaltenes, and formation of clays in situ.

Thus, the objects of this invention are as follows:
1. To provide an improved and more economical method of preventing fines migration in a reservoir through control of the pH of the condensate phase of an injected two phase steam mixture.
2. To provide an improved and more economical method of preventing clay swelling through control of the pH of the condensate phase of an injected two phase steam mixture.
3. To provide a method for minimizing formation of additional clay minerals within a reservoir through control of the pH of either or both of the condensed steam and the condensate phases of an injected single or two phase steam mixture.
4. To provide an improved and more economical method for minimizing the dissolution of carbonate minerals through control of the pH of the condensed steam phase of an injected single or two phase steam mixture.
5. To provide a method for preventing the precipitation of asphaltenes in a reservoir through control of the pH of the condensed steam phase of an injected single or two phase steam mixture.
6. To provide a method for minimizing the formation of water-in-oil emulsions in a reservoir through control of the pH of the condensed steam phase of an injected single or two phase steam mixture.

SUMMARY OF THE INVENTION

Accordingly, the present invention relates to a method for reducing the reactivity of steam and mixtures of steam and condensate in enhanced oil recovery. More particularly, the invention comprises a method for effectively minimizing one or more of a number of specific formation damage problems through control of the pH of either or both of the condensed steam phase and the condensate phase which are injected into the reservoir.

Practice of the present invention requires two steps.

In the first step, a preferred pH range is determined for either or both of the condensed steam phase and the condensate phase which will provide an adequate level of protection from whichever formation damage problems are considered to be the most harmful to oil recovery for the application in question.

In the second step, the condensate or condensed steam pH is controlled to within the desired range through the addition of either or both of ammonia and an ammonium salt to the injected fluid.

Where fines migration is a target formation damage problem, the first step is to determine the pH above which significant migration of fines occurs, normally through laboratory testing. In this case, only the condensate phase is controlled, with the pH being kept below the minimum value where significant fines migration occurs. The preferred pH range will be 0.01 to 2.0 pH units below the minimum pH where significant fines migration occurs. More preferably, the pH range will be 0.1 to 0.5 pH units below the critical pH for fines migration.

Where clay swelling is a target formation damage problem, the first step is to determine the maximum pH at which damage to the formation is minimal. This is normally determined through laboratory testing. In this case, only the condensate phase pH is controlled, and a maximum value is chosen which maintains the estimated long term permeability of the formation at 50 percent or more of its original value. Preferably, the condensate pH will be within 0.01 to 2.0 pH units of that at which the estimated reservoir permeability is reduced by clay swelling to 80 percent of its original value over the long term. More preferably, the desired condensate pH will be between 0.1 and 1.0 pH units below the estimated long term 80 percent permeability value.

Where formation of additional clay minerals in a reservoir is a target formation damage problem, the first step is to determine the pH range or ranges in which precipitation of these minerals will occur. In this case, either or both of the condensate phase pH and the condensed steam phase pH is controlled to a value within the range where no significant precipitation of clays will occur. The preferred pH of each phase is between 0.01 and 2.0 pH units outside the range where new clay minerals are stable in the solid phase, the condensed steam phase being left slightly more acidic and the condensate phase being left slightly more alkaline than the solid phase stability boundary value. More preferably the pH range of each phase is between 0.1 and 1.0 pH units outside the stability boundary.

Where dissolution of carbonates is a target formation damage problem, the first step is to determine the minimum pH at which the mechanical competence of the formation is maintained and the estimated long term permeability of the reservoir near the production well is maintained at 50 percent or more of its original value. Preferably, the pH should be between 0.01 and 2.0 pH units above the level where mechanical competence of the formation is maintained and the estimated long term permeability of the reservoir near the production well is maintained at 80 percent or more of its original value. More preferably, the pH should be between 0.1 and 1.0 pH units above the level where mechanical competence of the formation is maintained and the estimated long term permeability of the reservoir near the production well is maintained at 80 percent or more of its original value.

Where prevention of the precipitation of asphaltenes is a target formation damage problem, the first step is to determine the maximum pH at which precipitation of asphaltenes will occur, normally through laboratory tests. In this case, only the condensed steam phase pH is controlled, the value being kept above the maximum pH where asphaltene precipitation occurs. The preferred pH will be between 0.01 to 2.0 pH units above the point where asphaltene precipitation occurs. More preferably, the pH range will be between 0.1 and 1.0 pH units above the critical pH for asphaltene precipitation.

Where preventing the formation of water-in-oil emulsions is a target formation damage problem, either or both of the condensate pH and the condensed steam pH is controlled. The pH of either or both phases should be in the range where long term emulsion stability is relatively low. Preferably, the pH of either or both phases will be within the range where less than 50 percent of emulsions formed in the reservoir are stable over the long term. More preferably, the pH of either or both phases will be within the range where less than 30 percent of emulsions formed in the reservoir are stable over the long term.

The second step in this invention consists of the addition to the injected fluid of either or both of an ammonium salt, which will lower the pH of the condensate phase and raise the pH of the condensed steam phase, and ammonia or ammonium hydroxide, which will raise the pH of both the condensate and the condensed steam phases.

The ammonium salt is preferably added either upstream or downstream of the steam generator, while the ammonia or ammonium hydroxide is preferably added downstream of the steam generator. If only the vapor phase of the two phase steam generator effluent is to be injected into the reservoir, then ammonia is preferred to ammonium hydroxide, and it is preferably added downstream of the steam separator.

DETAILED DESCRIPTION OF THE INVENTION

In the injection of steam or steam-condensate mixtures into a petroleum reservoir as a means of enhanced oil recovery, at least three classes of formation damage may occur as a result of contact between the injected fluids and the rock matrix: fines migration, clay swelling, and hydrothermal alteration of the rock minerals. In addition, contact between the injected fluids and the oil can result in at least two additional forms of formation damage: formation of water-in-oil emulsions and asphaltene precipitation.

All of these types of damage are pH-dependent and can result from contact between the formation and either an alkaline condensate or an acidic steam phase or between the oil and an acidic steam phase.

This formation damage manifests itself by a reduced permeability of the reservoir to oil and a consequent reduction in the rate at which oil can be produced. It is not unusual for a reservoir to be left with a relative permeability to oil two or three orders of magnitude smaller than the undamaged value.

This invention reduces or eliminates many types of pH-dependent formation damage in a two step process. In the first step, the desired pH range of either or both of the condensate phase and condensed steam phase is determined. In the second step, a combination of either or both of ammonia and an ammonium salt is added to the steam generator feedwater or effluent to control the pH within the desired range. A number of embodiments of each of the two steps of the invention are described below.

Fines migration is a major source of permeability decline in many reservoirs, and refers to the movement of small particles of rock or clay carried by the flowing fluids in the reservoir to constrictions in the flow path such as pore mouths where they lodge and block flow. This blocking may occur if the fine particle has a larger diameter than the pore mouth, if a number of particles smaller than the pore mouth arrive simultaneously, creating a "log jam" effect, or if very small particles become deposited near the pore mouth without plugging it, but gradually reducing its diameter until one of the other two mechanisms becomes operative.

Fine particles may be defined as any particles with a diameter less than approximately 50 microns and can be composed of any mineral which is present in significant quantities in the reservoir. This may include quartz, feldspars, carbonates, chert, and especially clays, such as kaolinite, and to a lesser degree illite, chlorite, and smectite.

Fines migrate when the hydraulic forces of the flowing fluid in the reservoir are sufficient to overcome the forces holding the fine particle in place. The forces binding the fine particles to each other and to the rock matrix are believed to be mainly hydrogen bonding and Van der Waals forces, which act against and overcome any electrostatic forces which may be present.

For example, in an oil reservoir in its natural state, it is common for clay particles to occur in a flocculated condition, i.e. in clumps of many smaller particles held together by the weak forces mentioned above. Since the hydraulic forces necessary to move the floc are much greater than those required to separately move the individual particles of which it is composed, an effective technique of preventing fines migration is to maintain clays in this flocculated state.

One technique for maintaining the attractive forces between fine particles and the rock matrix is to control the ionic strength of the fluid with which the particles are in contact; this is well known in the prior art. A much more cost-effective technique is to control the pH of the fluid, which is the subject of one aspect of the present invention.

Normally there is a fairly specific pH for any system containing water and fine particles above which the fine particles exist in a deflocculated state and below which the natural tendency of the particles is to flocculate. There is no single value of this critical pH for fines migration which can be used for all reservoir systems, rather it is dependent on the mineralogies of the fines and rock matrix, the ionic content of the water, and temperature. Normally, this critical pH is determined in laboratory tests using reservoir core samples into which a series of fluids of varying pH is injected until the fine particles deflocculate. This critical pH is often manifest by a drastic and fairly instantaneous reduction in permeability. Other methods of determining the critical pH for fines migration will be readily apparent to those skilled in the art.

Thus, the first step in the practice of the embodiment of this invention in which the object is to prevent fines migration is to determine the desired pH of the injected fluids. In this embodiment, only the condensate phase pH is controlled, and this pH should be maintained at a level below the critical pH for fines migration. For economic reasons, the amount of additive used in the second step of this invention should be minimized, and the preferred condensate pH will be between 0.01 and 2.0 pH units below the critical pH for fines migration. More preferably, the condensate pH will be between 0.1 and 0.5 pH units below the critical pH.

Since fine particles can be oil-wet, water-wet, or wet by both oil and water, and these particles will migrate only in the phase that wets them, methods which involve treatment of the aqueous phase will affect only fines which are water-wet or wet by both oil and water. Thus it is preferred in the embodiment of the present invention in which the object is to prevent fines migration that a significant proportion of the fine particles be partially or completely water-wet.

A second major source of formation damage or permeability impairment in petroleum reservoirs is the swelling of layered clays, such as members of the smectite family, including mixed-layer clays such as illite-smectite. Swelling causes a decrease in permeability mainly through the occlusion of pore mouths, but damage can also result when unequal swelling between layers of a clay particle causes fragments to break off and become migrating fines. Hydroxyl ions are well known to increase the tendency of swelling clays to absorb water between their layers, and thus it is an object of the present invention to control the swelling of layered clays by decreasing the pH of fluids with which the clays are in contact.

Swelling clays in various reservoirs differ widely in their tendency to plug the formation and impair productivity. In addition to pH, the degree of formation damage that will take place may depend on the composition of the swelling clays, their location in the porosity of the rock, the temperature in the formation, and the ionic composition of the water in contact with the swelling clays. Consequently, it is impossible to predict a priori the maximum pH value which will provide an acceptably low level of clay swelling at a reasonable treatment cost.

Thus, the first step in the practice of the embodiment of this invention in which the object is to prevent clay swelling is to determine the maximum desired pH of the injected fluids. Usually this is done through a laboratory testing program, for example by measuring the permeabilities of core plugs at various treatment conditions. In this embodiment, only the condensate phase pH is controlled, since this phase will always be the more harmful in terms of clay swelling.

Unlike the case of fines migration, there is no single pH value separating the regimes of "no damage" and "complete and instantaneous damage"; rather as the pH of the water in contact with a given clay is increased, the system progresses gradually from "no swelling" through "slight swelling" to "moderate swelling" to "severe swelling", and an acceptable operating regime will depend on economic considerations. In addition, the results of relatively short term laboratory experiments will usually need to be extrapolated through the productive life of the reservoir.

Generally, it will be desired to operate at a pH below that at which the estimated permeability of the formation is maintained at 50 percent or more of its original value throughout the productive life of the reservoir. Preferably, the condensate pH will be between 0.01 and 2.0 pH units below the pH at which the estimated long term permeability of the reservoir is reduced to 80 percent of its original value by clay swelling. More preferably, the condensate pH will be between 0.1 and 1.0 pH units below the level where the estimated long term permeability is reduced to 80 percent of its original value.

A third major source of formation damage in petroleum reservoirs results from hydrothermal alterations of the minerals present in the formation. The original formation water normally has a near-neutral pH, and is normally in substantial equilibrium with the formation minerals. When this water is displaced by an injected steam condensate of higher pH or a condensed steam of lower pH, this equilibrium is destroyed, and a number of chemical reactions proceed, moving the system toward a new equilibrium. Virtually all of the reactions which result from high pH condensate or low pH condensed steam contacting reservoir minerals cause a loss in permeability.

The following are some of the reactions which have been shown to take place when alkaline solutions contact mineral formations, with higher pH causing more complete reaction in all cases, i.e. driving the equilibrium further to the right.

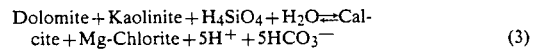
$$\text{Dolomite} + \text{Kaolinite} + \text{H}_4\text{SiO}_4 + \text{H}_2\text{O} \rightleftharpoons \text{Calcite} + \text{Mg-Chlorite} + 5\text{H}^+ + 5\text{HCO}_3^- \qquad (3)$$

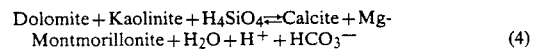
$$\text{Dolomite} + \text{Kaolinite} + \text{H}_4\text{SiO}_4 \rightleftharpoons \text{Calcite} + \text{Mg-Montmorillonite} + \text{H}_2\text{O} + \text{H}^+ + \text{HCO}_3^- \qquad (4)$$

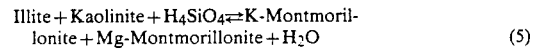
$$\text{Illite} + \text{Kaolinite} + \text{H}_4\text{SiO}_4 \rightleftharpoons \text{K-Montmorillonite} + \text{Mg-Montmorillonite} + \text{H}_2\text{O} \qquad (5)$$

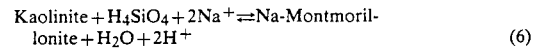
$$\text{Kaolinite} + \text{H}_4\text{SiO}_4 + 2\text{Na}^+ \rightleftharpoons \text{Na-Montmorillonite} + \text{H}_2\text{O} + 2\text{H}^+ \qquad (6)$$

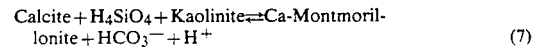
$$\text{Calcite} + \text{H}_4\text{SiO}_4 + \text{Kaolinite} \rightleftharpoons \text{Ca-Montmorillonite} + \text{HCO}_3^- + \text{H}^+ \qquad (7)$$

Reaction (3) has a product chlorite, while reactions (4), (5), (6), and (7) generate montmorillonite. In addition to the swelling nature of these clays, illite, chlorite, montmorillonite, other members of the smectite family, and mixed-layered clays such as corrensite and illite-smectite tend to be precipitated in a form with a great deal of microporosity. Consequently, a relatively small amount of kaolinite can be converted into another clay which can effectively reduce the permeability of a reservoir to nearly zero.

In addition, reactions involving carbonates normally produce bicarbonate ions, which remain in solution. When this solution undergoes a decrease in pressure, for example when the water is produced in either a cyclic steam or steam drive oil recovery application, carbon dioxide may be released from solution:

$$\text{HCO}_3^- \rightarrow \text{CO}_2 \uparrow + \text{OH}^- \qquad (8)$$

The resulting increase in pH can cause the precipitation of scale, such as $CaCO_3$, $MgCO_3$, etc., which can reduce permeability near the wellbore and interfere with the operation of production equipment.

Just as a highly alkaline pH can cause harmful mineralogical conversions, a highly acidic pH can also be a problem. Dissolution of silica, carbonates, and feldspars increases dramatically as the pH is dropped and a number of harmful mineralogical reactions are promoted. For example:

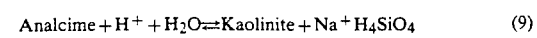
$$\text{Analcime} + \text{H}^+ + \text{H}_2\text{O} \rightleftharpoons \text{Kaolinite} + \text{Na}^+ + \text{H}_4\text{SiO}_4 \qquad (9)$$

$$Analcime + H^+ + H_2O \rightleftharpoons Smectite + Na^+ + H_4SiO_4 \quad (10)$$

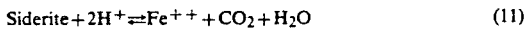

$$Siderite + 2H^+ \rightleftharpoons Fe^{++} + CO_2 + H_2O \quad (11)$$

In reaction (9), rock matrix is transformed into a migrating clay, in reaction (10) rock matrix is transformed into a high-microporosity expanding clay, and in reaction (11) rock matrix is converted in part to carbon dioxide, which may later induce scaling.

Reactions (3) through (11) are illustrative of some of the pathways through which hydrothermal alterations can lead to permeability damage; many combinations and variations of these will be readily apparent to those skilled in the art. In addition, the specific minerals listed in each reaction can usually be substituted with other minerals of the same family; these cases will also be apparent to those skilled in the art. Finally, these reactions are meant to represent overall conversions, and do not require or imply a specific reaction mechanism or stoichiometry.

In reactions (3) through (7) and (9) through (11), it is desirable to force the equilibrium as far to the left as possible. To do this, either the concentrations of the reactants in solution may be decreased, or the concentration of the products may be increased.

It is well known in the prior art that pH can be used to control the solubilities of a number of minerals, such as silica, however, this is not always the most effective way of controlling the above equilibrium. In certain pH ranges, the solubility of the reactant silica in reactions (3) through (7) can be decreased by decreasing pH, but the solubilities of other reactants is at the same time increased.

Thus the preferred conditions for minimizing silica dissolution, for example those disclosed in U.S. Pat. No. 4,475,595 to Watkins and Watanabe, are not necessarily those for minimizing reactions involving silica. Similarly, the preferred conditions disclosed in U.S. Pat. No. 4,714,112 to Nigrini and Hsueh for minimizing the solubility of carbonates and other minerals are not necessarily those for minimizing reactions involving carbonates.

Nevertheless, pH is a direct measure of the concentration of hydrogen ion in solution, and is thus a significant factor in all of reactions (3) through (7) and (9) through (11). However, the complexity of clay chemistry is such that it is impossible to specify in advance a preferred pH range for minimizing adverse clay transformations without a detailed knowledge of the mineralogy of the reservoir and the chemistry of the water present in the reservoir where steam enhanced oil recovery is to be applied.

Thus, the first step in the embodiment of this invention in which the object is to minimize the formation of clays in the reservoir is to determine the desired pH for each of the condensed steam and condensate phases. Normally, it will be desired to maintain the pH of each of the condensed steam and condensate phases within the range where undesirable clay minerals are unstable in the solid phase. These pH ranges can be obtained from laboratory experiments, but this method of analysis can be very time consuming and expensive. A more practical approach is to calculate the desired pH from thermodynamic principles using the available data on reservoir mineralogy and water composition. Computers can be used to perform these calculations, or published stability field diagrams can be consulted.

The preferred pH for the condensate phase will be between 0.01 and 2.0 pH units below the minimum pH where illite, chlorite, montmorillonite, mixed layer clays, or other members of the smectite family are stable in the solid phase. More preferred is between 0.1 and 1.0 pH units below the minimum pH where illite, chlorite, montmorillonite, mixed layer clays, and other members of the smectite family are stable in the solid phase.

The preferred pH for the condensed steam phase will be between 0.01 and 2.0 pH units above the maximum pH where kaolinite, illite, chlorite, montmorillonite, mixed layer clay, and smectite are stable in the solid phase. More preferred is between 0.1 and 1.0 pH units above the maximum pH where kaolinite, illite, chlorite, montmorillonite, mixed layer clay and smectite are stable in the solid phase.

Dissolution of carbonates such as calcite, dolomite, ankerite, and siderite is another widely recognized formation damage problem. For example, in formations where the primary mineral is carbonate, dissolution of the rock matrix can cause a collapse of the casing and loss of the well.

In formations where carbonate is a relatively minor component, damage can still occur by another mechanism. In either a steam drive or cyclic steaming operation, carbonates reach their equilibrium solubility values deep within the reservoir at relatively high temperatures and pressures. When the injected fluid has a lower pH, the equilibrium carbonate solubility is higher. When the reservoir is produced, both the oil and carbonate-saturated water undergo a drop in pressure. Carbon dioxide is released from solution and the pH of the liquid rises. This causes a decrease in the solubility of carbonate in solution, and scale precipitates, usually near the well where the oil is being produced. If a large quantity of carbonate is dissolved in the reservoir, a larger quantity of scale will be precipitated.

Thus, the first step in the embodiment of this invention in which the object is to minimize carbonate dissolution is to determine the lowest pH at which a minimum amount of formation damage will occur. This will depend greatly on the formation mineralogy and reservoir characteristics and on the details of the steam enhanced oil recovery process employed. In this embodiment, only the pH of the condensed steam phase is controlled, since this will always be the more damaging phase.

The condensed steam phase pH should be controlled to a level above that where the mechanical integrity of the formation is maintained and the estimated long term permeability of the reservoir near the production well is maintained at 50 percent or more of its original value. Preferably the pH should be between 0.01 and 2.0 pH units above the level where the mechanical integrity of the formation is maintained and the estimated long term permeability of the reservoir near the production well is maintained at 80 percent or more of its original value. More preferably the pH should be between 0.1 and 1.0 pH units above the level where the mechanical integrity of the formation is maintained and the estimated long term permeability of the reservoir near the production well is maintained at 80 percent or more of its original value.

In bitumens and heavy oils, which are the types of oils most commonly recovered by enhanced oil recovery processes using steam, are known to consist of a colloidal suspension of asphaltenes and resins in a lighter oil phase. When contacted with acids, the equilibrium of this colloidal suspension is destroyed, and asphaltenes may precipitate. These asphaltene particles can block pore throats and significantly decrease permeability.

For a given pressure and temperature the pH at which asphaltenes will begin to precipitate depends mostly on the chemical composition of the crude oil in question. Methods for predicting the onset of asphaltene precipitation based on a crude oil analysis and experimental techniques for determining the onset of asphaltene precipitation are well known in the art.

Accordingly, the first step in the embodiment of this invention in which the object is to prevent asphaltene precipitation is to determine the minimum pH of the injected fluids at which no precipitation will occur. In this embodiment, only the pH of the condensed steam phase is controlled. Preferably, the pH of the condensed steam phase will be between 0.01 and 2.0 pH units above the critical pH for asphaltene precipitation. More preferably, the pH of the condensed steam phase will be between 0.1 and 1.0 pH units above the critical pH for asphaltene precipitation.

Emulsions are well known in the art as a major factor in reducing the productivity of oil reservoirs. At low pH, water-in-oil, or water-in-oil-in-water emulsions predominate, and can be stabilized by both clays present in the reservoir and by asphaltic components in the crude. At high pH, oil-in-water emulsions predominate, and can be stabilized by natural surfactants present in the oil and by clays present in the reservoir.

It can be seen from the causes listed above that in addition to pH, the stability of any given emulsion depends strongly on the composition of the crude oil and water phases and on the presence of emulsion stabilizing mineral components in the reservoir. Although a slightly alkaline pH range is usually best for minimizing emulsion, this is not always true, and there are often opportunities to optimize reservoir and surface procedures when the actual dependence of emulsion stability on pH is known for the specific oil-water-rock system in question.

Thus, the first step in the practice of this invention in which the object is to minimize emulsion formation is to determine the pH range in which emulsion stability is acceptably low. Normally, this is done in laboratory tests using methods well known in the art. Because the stability of emulsions is highly dependent on the viscosity of the fluids and on the amount of shear used to create the emulsion, these variables must be carefully controlled in the laboratory if reservoir conditions are to be realistically reproduced.

In this embodiment, the pH of either or both of the condensed steam phase and the condensate phase is controlled at levels where emulsion stability is acceptably low. Preferably the pH of either or both phases will be within the range where less than 50 percent of emulsions formed in the reservoir are stable over the long term. More preferably, the pH of either or both phases will be within the range where less than 30 percent of emulsions formed in the reservoir are stable over the long term.

In the second step of this invention, the pH of either or both of the condensate phase and the condensed steam phase is controlled to within the range determined in the first step. This is accomplished by the addition of either or both of an ammonium salt, which normally lowers the pH of the condensate phase and raises the pH of the condensed steam phase, and ammonia or ammonium hydroxide, which normally raises the pH of both the condensed steam phase and the condensate phase.

Ammonium salts affect the pH of the condensate and condensed steam phases by decomposing and partitioning ammonia between the liquid and vapor phases. For example, ammonium chloride in aqueous solution first dissociates into ammonium and chloride ions:

$$NH_4Cl\ (aq) \rightarrow NH_4^+ + Cl^- \quad (11)$$

At low temperatures, there is negligible effect on pH. At higher temperatures, however, the ammonium ion breaks down into ammonia and a proton:

$$NH_4^+ \rightarrow NH_3 + H^+ \quad (12)$$

The proton produced in reaction (12) serves to neutralize the hydroxyl ion produced in the steam generator in reaction (1), while much of the ammonia partitions into the gas phase.

In addition to reducing the pH of the alkaline steam condensate, the pH of the acidic condensed steam is also raised by the ammonia released in reaction (12) which also goes into solution and acts as a Lewis base:

$$NH_3 + H_2O \rightarrow NH_4^+ + OH^- \quad (13)$$

Reaction (13) also describes the effect of adding ammonia to the injected fluids. Part of the ammonia dissolves in the condensate phase immediately, raising its pH, while the remainder stays in the vapor phase, segregating and later condensing in the reservoir with the steam, and neutralizing the carbonic acid formed in reaction (2). Ammonium hydroxide behaves similarly to ammonia in this application, partitioning ammonia between the condensate and steam phases and raising the pH of both.

Any ammonium salt which decomposes upon heating in solution to raise the pH of the condensed steam phase and lower the pH of the condensate phase would be suitable for this invention. Examples include urea, ammonium bicarbonate, ammonium zirconyl carbonate, ammonium sulfite, ammonium bisulfite, ammonium fluoride, ammonium difluoride, ammonium biborate, ammonium bichromate, ammonium bromide, ammonium dimolybdate, ammonium fluoborate, ammonium heptamolybdate, ammonium lauryl sulfate, ammonium oxalate, ammonium pentaborate, ammonium silicofluoride, ammonium thiocyanate, ammonium citrate, and ammonium formate.

Preferred are compounds which are lower in cost when compared on the basis of equal effect on pH, such as ammonium chloride, ammonium bisulfate, and ammonium thiosulfate.

Particularly preferred are ammonium nitrate, ammonium sulfate, ammonium phosphate, and ammonium biphosphate.

Ammonium salts which decompose to form an acidic gas are somewhat less effective in the practice of this invention. For example, ammonium carbonate and ammonium bicarbonate yield carbon dioxide as a decomposition product, and the ammonia and the carbon dioxide have a cancelling effect on each other as regards pH in both the condensate and condensed steam phases. Thus, it can be seen that the practice of pH control in the present invention is significantly different from the practice of ammonium ion control as described by Watkins and Watanabe in U.S. Pat. No. 4,475,595, Watkins et al in U.S. Pat. No. 4,549,609, and Hsueh and Reed in U.S. Pat. No. 4,802,533.

Ammonium hydroxide cannot be used as the ammonium salt in the present invention, since it acts to increase rather than decrease the pH of the condensate phase. Thus, the practice of pH control in the present invention is also significantly different from the practice of Nigrini and Hsueh in U.S. Pat. No. 4,714,112.

A number of additional compounds which would be suitable for the practice of this invention will be readily apparent to those skilled in the art.

In the most common embodiment of this invention, both the steam phase and the condensate phase are injected into the reservoir. Addition of the ammonium salt alone can be used to control either the condensate pH of the condensed steam pH. Control of the pH of both phases can be accomplished by the addition of the ammonium salt and either ammonia or ammonium hydroxide. If a highly alkaline condensate is acceptable for a particular application, ammonia or ammonium hydroxide can be used alone to raise the pH of the condensed steam phase.

In some applications of enhanced oil recovery using steam, the steam and condensate phases are separated at the surface, downstream of the steam generator, and only the steam phase is injected into the reservoir. In this embodiment, ammonia, ammonium hydroxide, or an ammonium salt as described above can be used to raise the condensed steam pH to the desired value. Ammonia is preferred to ammonium hydroxide in this application.

The ammonium salt in any of the above embodiments can be added either upstream or downstream of the steam generator. When ammonium hydroxide is used, it should be added downstream of the steam generator. When ammonia is used, it should be added downstream of the steam generator, and downstream of the steam separator, if there is one.

In another embodiment of this invention, it may be desired to decrease the permeability of areas of the formation into which the condensate phase is injected to force the steam phase into new unheated zones. In this case, it may be desired to protect these unheated zones from damage by condensed acidic steam, while it is desired to avoid protecting the zones contacted by the alkaline condensate. In this embodiment, ammonia would be a preferred additive.

Temperature plays an important role in the practice of this invention, not only because of tis effect on various types of formation damage, but also because of the dependence of pH on temperature. For example, the pH of distilled water is 7.0 at 25° C., but only 5.7 at 300° C. The relationship between pH and temperature is also strongly affected by the presence of dissolved salts: an aqueous solution containing numerous buffering species could have a pH of 7.0 at 25° C., but be far from 5.7 at 300° C.

This presents a difficulty for the practitioner, who wishes to control fluid pH at some temperature in the reservoir where formation damage might take place, but can only directly affect the pH at the temperature of the steam prior to injection, and usually can only measure pH at a temperature much lower than the injection temperature, usually close to ambient. Techniques for relating pH values at these three temperatures, injection, reservoir, and measurement, can be seen to be of obvious value. Computer programs which calculate pH based on thermodynamic principles are readily available and are a preferred component of this invention.

It will also be obvious to those skilled in the art that various embodiments of this invention can be combined. For example, control of the pH of both the condensed steam and condensate phases can be used to simultaneously prevent more than one type of formation damage from occurring.

Other objects, advantages and features of this invention will become apparent to those skilled in the art from the appended claims.

The invention is further illustrated by the following examples which are illustrative of various aspects of the present invention and are not intended to limit the scope of the invention as defined by the appended claims.

EXAMPLE 1

Water with the composition shown in Table 1 was used to generate steam with an estimated downhole quality of 70 percent and a temperature of 300° C. Laboratory testing had shown that fines migration was a serious problem at a pH above about 6.25 (measured at 300° C.).

TABLE 1

| Steam Generator Feed Water Analysis | |
| --- | --- |
| | mg/l |
| Ca | 0.013 |
| Mg | 0.0043 |
| Na | 165.0 |
| K | 2.9 |
| Cl | 22.0 |
| SO$_4$ | 50.0 |
| SiO$_2$ | 17.0 |
| Cu | 0.02 |
| Fe | 0.34 |
| F | 0.38 |
| NO$_3$ | 0.56 |
| pH (25° C.) = | 7.8 |
| methyl orange alkalinity as CaCO$_3$ = 416 mg/l | |

Without treatment, the condensed steam phase pH was calculated to be 5.29 (4.27 at 25° C.), and the condensate phase pH was calculated to be 8.46 (11.05 at 25° C.). In order to reduce the condensate phase pH, a number of additives were considered. These are shown in Table 2. Also shown in this table are the approximate cost of each additive and the condensate phase pH after addition of each additive, calculated for 300° C. using the public domain geochemical equilibrium computer program "SOLMNEQ".

Two conclusions can be drawn from these results. First, ammonium sulfate is the least expensive additive for this application, followed by ammonium phosphate, ammonium biphosphate, and ammonium nitrate. Second, ammonium bicarbonate cannot be used in this application: even at extremely high levels of addition, it is ineffective in lowering the pH to the desired value, although some degree of pH lowering does occur.

TABLE 2

| Additive | Cost $/lb. | Amount Required g/tonne feedwater | Cost $/tonne feedwater | Condensate pH after treatment |
|---|---|---|---|---|
| Ammonium Bicarbonate | 0.28 | 79000 | 48.70 | 7.25 |
| Ammonium Nitrate | 0.065 | 675.2 | 0.097 | 6.24 |
| Ammonium Chloride | 0.18 | 451.5 | 0.179 | 6.20 |
| Ammonium Difluoride | 0.70 | 313.5 | 0.483 | 6.24 |
| Ammonium Sulfate | 0.03 | 607.2 | 0.040 | 6.21 |
| Ammonium Phosphate | 0.078 | 625.8 | 0.107 | 6.30 |
| Ammonium Biphosphate | 0.073 | 554.4 | 0.089 | 6.28 |
| Ammonium Oxalate | 1.42 | 533.2 | 1.666 | 6.20 |

EXAMPLE 2

A feedwater of composition similar to that given in Example 1 will be used to generate steam for injection into the Clearwater formation, a reservoir containing Cold Lake crude. It is desired to design a treatment program which will minimize emulsion formation using pH control.

Published data on clay-stabilized emulsions of Cold Lake bitumen are available (Gewers, C. W. W., J. Cdn. Pet. Technol., Apr.–June 1968, p 85) which show that the pH should be maintained within the range 7.2 to 9.1 to keep the fraction of the emulsion remaining stable after 50 hours at ambient temperature below 30 percent. (Untreated, 85 percent of condensed steam and 95 percent of condensate emulsions would remain stable under these experimental conditions.) It was decided to use these data as a design basis, since it was felt that the downhole formation of emulsions was mostly occurring at temperatures only slightly above ambient and that 25° C. data would be relatively representative.

Table 3 shows the calculated pH values of the condensate and condensed steam for various levels of ammonium nitrate and ammonium hydroxide addition. From this table, it can be seen that addition of 800 g/m$^3$ of ammonium nitrate and 17.5 g/m$^3$ of ammonium hydroxide to the steam generator effluent gives values of the pH of both the condensate and condensed steam very close to the desired range.

TABLE 3

| NH$_4$NO$_3$ added, g/m$^3$ | NH$_4$OH added, g/m$^3$ | Condensate pH | | Condensed Steam pH | |
|---|---|---|---|---|---|
| | | 300° C. | 25° C. | 300° C. | 25° C. |
| 0 | 0 | 8.46 | 11.05 | 5.29 | 4.27 |
| 80 | 0 | 8.38 | 10.96 | 6.11 | 5.63 |
| 400 | 0 | 8.03 | 10.56 | 6.40 | 6.49 |
| 640 | 0 | 7.41 | 9.95 | 6.46 | 6.90 |
| 800 | 0 | 4.87 | 9.00 | 6.47 | 7.00 |
| 1600 | 0 | 4.00 | 8.17 | 6.47 | 7.00 |
| 4000 | 0 | 3.55 | 7.49 | 6.50 | 7.29 |
| 800 | 3.5 | 4.88 | 9.00 | 6.49 | 7.12 |
| 1600 | 17.5 | 4.03 | 8.23 | 6.50 | 7.33 |
| 1600 | 35.0 | 4.04 | 8.26 | 6.51 | 7.61 |
| 800 | 17.5 | 4.90 | 9.04 | 6.50 | 7.29 |
| 800 | 175.0 | 5.05 | 9.28 | 6.58 | 8.78 |
| 1600 | 175.0 | 4.19 | 8.50 | 6.58 | 8.78 |

A number of additional aspects of this invention are also highlighted by this example.

Foremost is the importance of choosing the appropriate temperature at which to perform the calculations. After treatment, the calculations for 25° C. show that the condensed steam phase pH is either slightly acidic or slightly alkaline and the condensate phase pH is slightly alkaline, as expected. At the expected injection temperature of 300° C., in most cases both phases are alkaline, but surprisingly, the condensate phase can be slightly acidic, with the condensed steam phase 2 to 3 pH units higher than the condensate phase.

The advantages of using both additives are also shown. Addition of 4000 g/m$^3$ of ammonium nitrate alone will bring both the condensed steam pH and the condensate pH to within the target range, but the cost is significantly higher than for the combination of two additives. If it were desired to bring both phases to the optimum pH for emulsion breaking of 8.2, this could be accomplished with a suitable combination of the two ammonium compounds, but could not be accomplished using one compound alone. For some crudes requiring an even more alkaline system, both compounds will be necessary to achieve any appreciable reduction in emulsion forming tendency. Tests using the specific crude to be recovered are an important step in this invention.

It is also shown that there are limits to the degree of pH control which can be accomplished especially in cases where large reductions in condensate phase pH are desired at lower temperatures.

EXAMPLE 3

A water with the composition shown in Table 4 will be used to generate 300° C., 80 percent quality steam for a heavy oil recovery project. It is planned to separate the steam phase from the condensate phase in surface facilities, and inject only the steam into the reservoir. It is anticipated that the condensed steam phase could cause asphaltene precipitation problems if the pH were allowed to remain acidic at the estimated reservoir temperature of 200° C. One technique under consideration is the addition of ammonia gas to the steam phase downstream of the steam separator.

TABLE 4

| | mg/l |
|---|---|
| Na$^+$ | 130 |
| Ca$^{++}$ | 1 |
| Cl$^-$ | 17 |
| HCO$_3^-$ | 159 |
| SO$_4^=$ | 50 |
| pH = 8.2 at 25° C. | |

The results of calculations showing the effect of ammonia addition on the condensed steam phase pH are shown in Table 5. Distilled water has a pH of 5.66 at 200° C., and it can be seen that very small amounts of ammonia can be used to raise the pH above this value.

TABLE 5

| NH$_3$ added g/m$^3$ | Condensed Steam pH 200° C. |
|---|---|
| 0 | 4.96 |
| 0.85 | 5.48 |

TABLE 5-continued

| NH3 added g/m³ | Condensed Steam pH 200° C. |
|---|---|
| 1.36 | 5.62 |
| 1.7 | 5.68 |
| 3.4 | 5.88 |

What is claimed is:

1. A method for controlling pH-dependent mechanisms of formation damage other than those caused by silica dissolution resulting from reservoir contact with alkaline condensate and acidic condensed steam in the process of steam enhanced oil recovery, comprising
   (a) determining the ranges of condensate phase pH and the condensed steam phase pH which will not cause significant formation damage; and
   (b) controlling the pH of both the condensate phase and the condensed steam phase to within the ranges where damage will not occur by adding to the feed-water used to generate the steam or to the steam itself an ammonium salt which will reduce the condensate phase pH and increase the condensed steam phase pH, and either ammonia or ammonium hydroxide.

2. The method defined in claim 1 wherein the ammonium salt is ammonium nitrate, ammonium chloride, ammonium sulfate, ammonium phosphate, ammonium biphosphate, or a mixture of ammonium salts containing at least one of these salts.

3. A method for controlling the migration of fines resulting from contact in the reservoir between fine particles and alkaline condensate in the process of steam enhanced oil recovery, comprising
   (a) determining the maximum condensate pH which will prevent significant fines migration; and
   (b) controlling the pH of the condensate phase to a value below this critical pH by the addition of an ammonium salt to the feedwater used to generate the steam or to the steam itself.

4. The method defined in claim 3 where the condensate phase pH is controlled to a value between 0.01 and 2.0 pH units below the maximum pH which will prevent significant fines migration.

5. The method defined in claim 3 where the condensate phase pH is controlled to a value between 0.1 and 0.5 pH units below the maximum pH which will prevent significant fines migration.

6. The method defined in claim 3 wherein the fine particles are substantially composed of kaolinite, illite, chlorite, quartz, or feldspar.

7. A method for controlling the swelling of clays resulting from contact with alkaline condensate in the process of steam enhanced oil recovery, comprising
   (a) determining the maximum condensate pH which will prevent clay swelling from reducing the estimated permeability of the formation to below 50 percent of its original value over the productive life of the reservoir; and
   (b) controlling the pH of the condensate phase to a value below the value determined in step (a) by the addition of an ammonium salt to the feedwater used to generate the steam or to the steam itself.

8. The method defined in claim 7 where the condensate phase pH is controlled to a value between 0.01 and 2.0 pH units below the pH at which the estimated long term permeability of the reservoir is reduced to 80 percent of its original value by clay swelling.

9. The method defined in claim 7 where the condensate phase pH is controlled to a value between 0.1 and 1.0 pH units below the pH at which the long term permeability of the reservoir is reduced to 80 percent of its original value by clay swelling.

10. The method defined in claim 7 in which the clay is a smectite of a mixed layer clay containing smectite.

11. A method for controlling chemical reactions in which clay minerals are formed when alkaline condensate contacts a mineral formation in the process of steam enhanced oil recovery, comprising
    (a) determining the maximum pH at which illite, chlorite, montmorillonite, other smectites, and mixed layer clays will all be unstable as solid phases in equilibrium with the injected condensate and the minerals already present in the reservoir; and
    (b) controlling the pH of the condensate phase to a value below the maximum value determined in step (a) by the addition of an ammonium salt to the feedwater used to generate the steam or the steam itself.

12. The method defined in claim 11 where the condensate phase pH is controlled to a value between 0.01 and 2.0 pH units below the maximum determined in step (a).

13. The method defined in claim 11 wherein the condensate phase pH is controlled to a value between 0.1 and 1.0 pH units below the maximum determined in step (a).

14. A method for controlling chemical reations in which clay minerals are formed when acidic condensed steam contacts a mineral formation in the process of steam enhanced oil recovery, comprising
    (a) determining the minimum pH at which kaolinite, illite, chlorite, montmorillonite, other smectites, and mixed layer clays will all be unstable as solid phases in equilibrium with the condensed injected steam phase and the minerals already present in the reservoir; and
    (b) controlling the pH of the condensed steam phase to a value above the minimum value determined in step (a) by the addition to the feedwater used to generate the steam or to the steam itself of an ammonium salt, ammonia, ammonium hydroxide, or a combination of ammonium salt and either ammonia or ammonium hydroxide.

15. The method defined in claim 14 where the condensed steam phase pH is controlled to a value between 0.01 and 2.0 pH units above the minimum value determined in step (a).

16. The method defined in claim 14 where the condensed steam phase pH is controlled to a value between 0.1 and 1.0 pH units above the minimum value determined in step (a).

17. A method for controlling the dissolution in a reservoir of carbonates when contacted by acidic condensed steam in the process of steam enhanced oil recovery, comprising
    (a) determining the minimum pH at which the mechanical integrity of the formation will be maintained and the estimated long term permeability of the reservoir near the production well will be maintained at 50 percent or more of its original value; and
    (b) controlling the pH of the condensed steam phase to a value above the minimum value determined in step (a) by the addition to the feedwater used to generate the steam or to the steam itself of an ammonium salt, ammonia, ammonium hydroxide, or a combination of ammonium salt and either ammonia or ammonium hydroxide.

18. The method defined in claim 17 where the condensed steam phase pH is controlled to a value between 0.01 and 2.0 pH units above the minimum value at which the mechanical integrity of the formation will be maintained and the estimated long term permeability of the reservoir near the production well will be maintained at 80 percent or more of its original value.

19. The method defined in claim 17 where the condensed steam phase pH is controlled to a value between 0.1 and 1.0 pH units above the minimum value at which the mechanical integrity of the formation will be maintained and the estimated long term permeability of the reservoir near the production well will be maintained at 80 percent or more of its original value.

20. The method defined in claim 17 in which the carbonates are substantially comprised of calcite, dolomite, siderite, or ankerite.

21. A method for controlling the precipitation of asphaltenes when as asphaltene-containing oil is contacted by acidic condensed steam in the process of steam enhanced oil recovery, comprising
    (a) determining the minimum pH at which no precipitation of asphaltenes will occur; and
    (b) controlling the pH of the condensed steam phase to a value above the minimum value determined in step (a) by the addition to the feedwater used to generate the steam or to the steam itself of an ammonium salt, ammonia ammonium hydroxide, or a combination of ammonium salt and either ammonia or ammonium hydroxide.

22. The method defined in claim 21 where the condensed steam phase pH is controlled to a value between 0.01 and 2.0 pH units above the minimum value determined in step (a).

23. The method defined in claim 21 where the condensed steam phase pH is controlled to a value between 0.1 and 1.0 pH units above the minimum value determined in step (a).

24. A method for controlling the formation of emulsions created when acidic condensed steam contacts oil in the process of steam enhanced oil recovery, comprising
    (a) determining the pH range where the long term stability of emulsions under reservoir or surface conditions is relatively low; and
    (b) controlling the pH of the condensed steam phase to a value within the range determined in step (a) by the addition to the feedwater used to generate the steam or to the steam itself of an ammonium salt, ammonia, ammonium hydroxide, or a combination of ammonium salt and either ammonia or ammonium hydroxide.

25. The method defined in claim 24 where the condensed steam phase pH is controlled to a value within the range where it is estimated that less than 50 percent of emulsions formed under reservoir or surface conditions will be stable over the long term.

26. The method defined in claim 24 where the condensed steam phase pH is controlled to a value within the range where it is estimated that less than 30 percent of emulsions formed under reservoir or surface conditions will be stable over the long term.

27. A method for controlling the formation of emulsions created when alkaline condensate contacts oil in the process of steam enhanced oil recovery, comprising
    (a) determining the pH range where the long term stability of emulsions under reservoir or surface conditions is relatively low; and
    (b) controlling the pH of the condensate phase to a value within the range determined in step (a) by the addition to the feedwater used to generate the steam or to the steam itself of an ammonium salt.

28. The method defined in claim 27 where the condensate phase pH is controlled to a value within the range where it is estimated that less than 50 percent of emulsions formed under reservoir or surface conditions will be stable over the long term.

29. The method defined in claim 27 where the condensed steam phase pH is controlled to a value within the range where it is estimated that less than 30 percent of emulsions formed under reservoir or surface conditions will be stable over the long term.

* * * * *